No. 867,483. PATENTED OCT. 1, 1907.
P. J. DARLINGTON.
SELF ADJUSTING BRAKE FOR HOISTS.
APPLICATION FILED MAY 11, 1904.

2 SHEETS—SHEET 1.

Witnesses
George W. Tilden
Helen Alford

Inventor
Philip J. Darlington,
By his Attorney

No. 867,483. PATENTED OCT. 1, 1907.
P. J. DARLINGTON.
SELF ADJUSTING BRAKE FOR HOISTS.
APPLICATION FILED MAY 11, 1904.

2 SHEETS—SHEET 2.

Witnesses:
George H. Tilden.

Inventor.
Philip J. Darlington,
by Albert G. Davis
Att'y.

UNITED STATES PATENT OFFICE.

PHILIP J. DARLINGTON, OF GLENRIDGE, NEW JERSEY, ASSIGNOR TO SPRAGUE ELECTRIC COMPANY, A CORPORATION OF NEW JERSEY.

SELF-ADJUSTING BRAKE FOR HOISTS.

No. 867,483.  Specification of Letters Patent.  Patented Oct. 1, 1907.

Application filed May 11, 1904. Serial No. 207,372.

*To all whom it may concern:*

Be it known that I, PHILIP J. DARLINGTON, a citizen of the United States, and a resident of Glenridge, county of Essex, and State of New Jersey, have invented certain new and useful Improvements in Self-Adjusting Brakes for Hoists, the principles of which are set forth in the following specification and accompanying drawings, which disclose the form of the invention which I now consider to be the best of the various forms in which the principles of the invention may be embodied.

The invention relates to hoisting apparatus combined with a self-adjusting brake, and more particularly to electrically-operated hoisting apparatus combined with such brakes; and certain features of the brake are of such character that they may be applied to other uses, although as herein shown, the brake is especially designed in combination with electrically-operated hoisting apparatus.

In hoisting apparatus, and especially in high-efficiency hoists, serious difficulty has hitherto resulted from the rapid wear of the brake shoes. In the lack of the greatest care in adjusting for wear of the shoes, the brake will not be effectively applied, and if it is not effectively applied immediately upon the stopping of the power, the load will drop. In the brake shown herein, there are two brake arms which, as the shoes wear, must move closer together to exert a braking effect. This increased, abnormal movement is utilized to remedy the defect which caused it.

Figure 1:
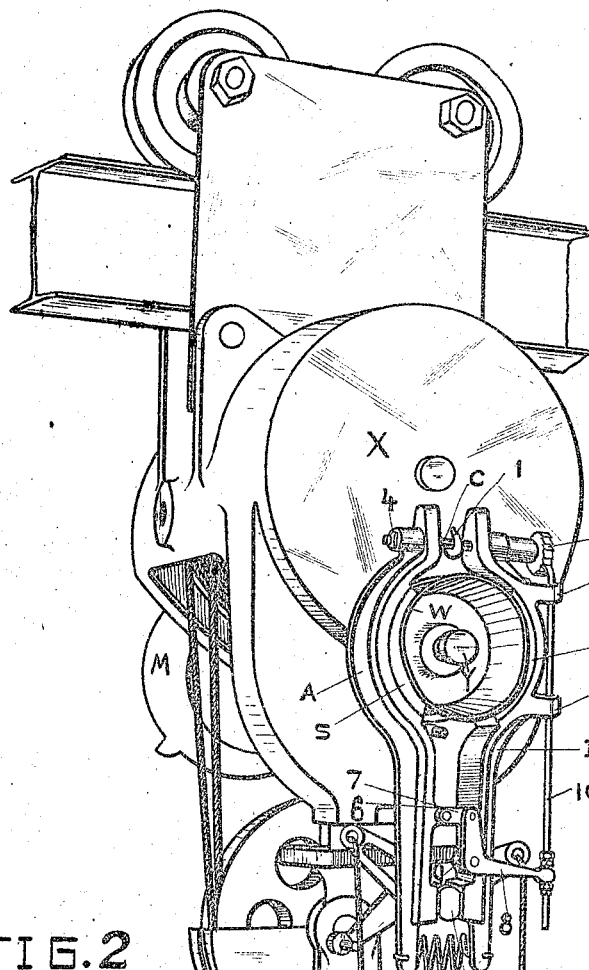
Figures 2, 3:
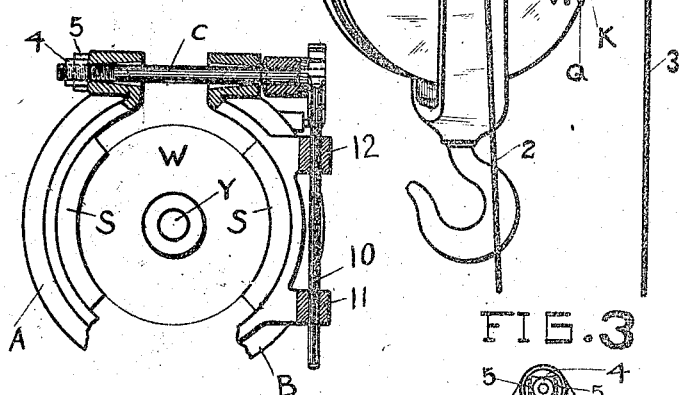
Figure 4:
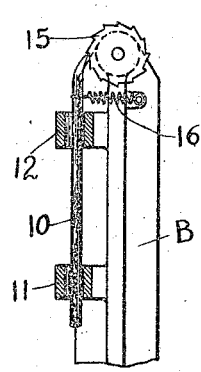
Figure 5:
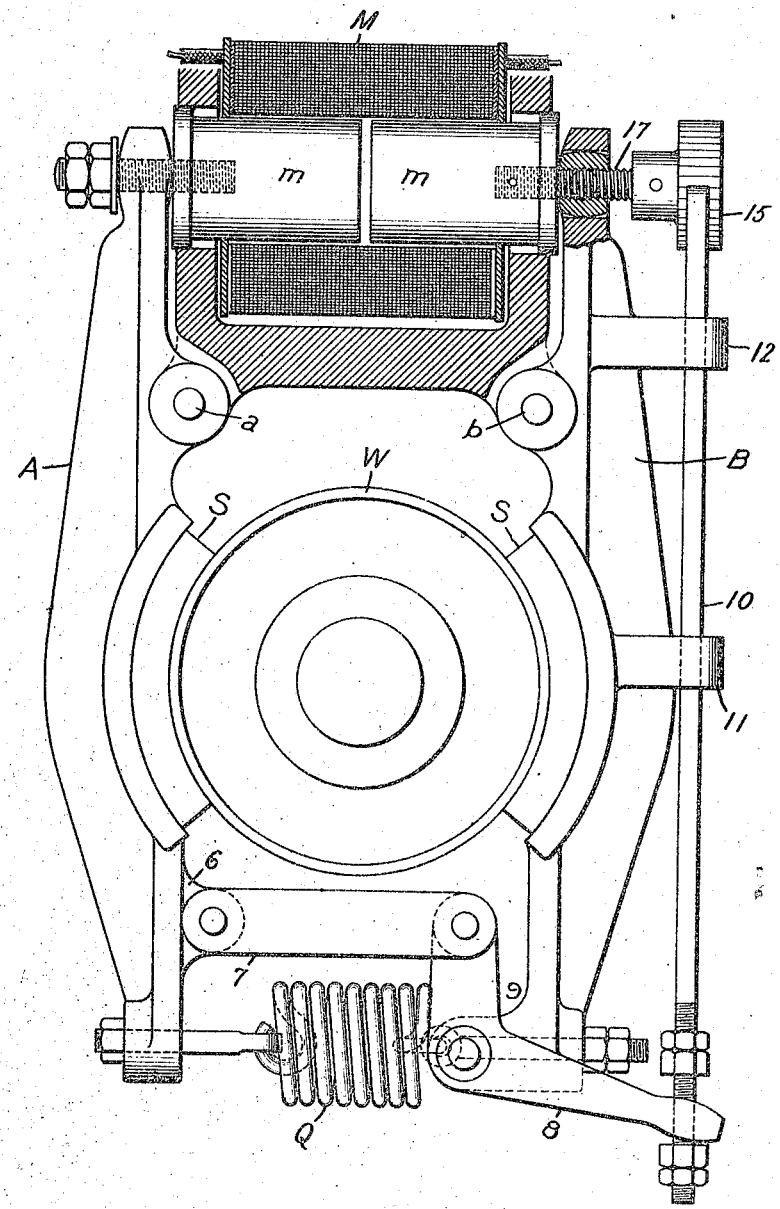

Of the drawings, Figure 1 is a perspective view showing the combination of an electrically-operated hoist and a self-adjusting brake; Fig. 2 is a face view, partly in section, of the upper parts of the brake arms; Fig. 3 is a detail view of the outer end of the upper part of the left-hand brake arm A; Fig. 4 is a side elevation, partly in section, of the upper part of the right-hand brake arm B and its attachments; and Fig. 5 shows my invention applied to a different form of releasing mechanism.

The arms A and B are pivotally suspended from the rod C, which is hung on the hook 1 in the hoisting-drum casing X. The rod C carries the entire brake. The openings (Fig. 2) in the upper ends of the arms A and B for the rod C are tapered, to permit pivotal movement of the arms. Shoes S are mounted on the arms A and B intermediate the ends thereof, to bear on the wheel W, which is the member to be braked. The wheel W is rotated by the shaft Y of the electric motor M, which motor operates the hoisting apparatus shown. A spring Q draws the lower ends of the brake arms A and B toward each other to apply the shoes S to the wheel W. The arms A and B, and the spring Q or its equivalent, may be arranged in other ways than the one shown, to effect substantially the same result. The arms A and B may be pivoted at parts of their length other than herein shown. The shaft K of the controller for the motor M extends between the arms A and B but is out of engagement therewith when the brake is applied, as shown in Fig. 1. Connections 2 and 3 enable the shaft K to be rotated by an individual standing below. When the connection 3 is pulled to rotate the shaft K clockwise to close the circuit of the motor M, the end of the shaft K, being wider vertically than horizontally, (in the position shown) forces the lower ends of the arms A and B further apart, and releases the brake. When the connection 2 is pulled, to cut off current from the motor M, the shaft K points its shorter diameter at the brake arms A and B, and permits the brake to be applied by the spring Q. Other means than the shaft K, but yet caused to be made operative by the motor-controller, may be located between the arms A and B, to release the brake when the motor is stopped.

As the shoes S wear, the lower ends of the arms A and B will approach closer and closer to the ends of the shorter diameter of the shaft K and to each other, before the operative application of the shoes S to the wheel W. As the brake-applying force, that is the spring Q, is substantially constant for a given extent of movement of the brake arms A and B, the brake will be less effectively applied as the shoes S wear. If no adjustment were made for this wear, the arms A and B would eventually be drawn together against the smaller diameter of the shaft K, or its equivalent, having then no braking effect on the wheel W.

The arms A and B may be adjusted at will, to compensate for wear and avoid contact with the shaft K, by screwing up the rod C, the left-hand end of which is threaded (Fig. 2) and engages in a nut 4 held from rotation between two lugs 5 on the arm A (Figs. 2 and 3). In practice, dependence upon manual adjustment by this means is found to be not only unsatisfactory, but dangerous. The brake and adjusting means are difficult of access, and usually no attention is given to the adjustment until the load slips or actually drops. Furthermore great care is required to effect the proper adjustment. In this type of high efficiency hoist, wherein the shoes S wear rapidly, frequent laborious attention to the adjustment is absolutely necessary, if accidents are to be prevented. To remedy this defect, means are provided, in accordance with this invention, for automatically effecting the adjustment, in proportion to the increased movement toward each other of the arms A and B, which occurs, as described, when the shoes S wear. In a lug 6 (Fig. 1) on the inner side of the arm A, is pivoted a link 7, to which link is pivoted the end of a bell-crank lever 8, which, in turn, is pivoted in a lug 9 of the arm B. A pawl 10 extends through, and is held in, the end of the lever 8, and reciprocates through lugs 11 and 12 on the arm B (Fig. 4). The upper end of the pawl 10 engages the teeth of the ratchet wheel 15, sleeved on and adapted to rotate the threaded rod C. A spring 16 is arranged to pull the pawl 10 toward the ratchet 15.

The pawl 10 rises each time the shaft K forces the arms A and B apart, and falls each time the arms are drawn together by the spring Q. The parts are arranged so that when the shoes S have not worn, these movements of the pawl 10 will not rotate the ratchet 15, as the total extent of movement of the pawl is less than the distance between the ratchet teeth. But as the shoes S wear, and the lower ends of the arms A and B consequently approach closer to each other, and to the smaller diameter of the shaft K, the rotation of the shaft K which permits the arms A and B to be moved against the wheel W, will cause the pawl 10 to be moved lower down. Finally, when the shoes S have worn sufficiently to threaten the operative application of the brake by the spring Q, the pawl 10 will be moved downwardly sufficiently far to draw its upper end from the tooth which it has been engaging. The spring 16 immediately draws that end under said tooth and against the next lower tooth. The next time the shaft K is turned to force apart the arms A and B, the pawl 10 will turn the ratchet wheel 15. This results in drawing and holding closer together, the upper ends or pivots of the arms A and B. Consequently the lower ends of those arms will then be required to be moved a less distance toward each other to effect an operative application of the brake. Hence, the operative effect of the spring Q is maintained substantially constant at all times.

The combination of the controller and brake and automatic adjusting means, is not limited to the mechanical controller-releasing operation heretofore disclosed. Thus in Fig. 5, I have shown my invention applied to a magnetically-operated releasing mechanism. In Fig. 5 the arms A and B are pivoted at points $a$ and $b$ intermediate their length, and the releasing mechanism consists of a magnet coil M and two movable magnet cores $m\ m$, which are secured to the ends of arms A and B, opposite to the spring Q. The magnet winding M may be connected in series with the motor or otherwise, in such manner that it is energized when the motor-circuit is closed. The magnet cores $m\ m$ are drawn inwards when magnet winding M is energized, and thereby release the brakes. In this arrangement, it is important that the space between the cores $m\ m$ should remain practically constant, as otherwise the pull exerted by the cores would vary, as the brake shoes wear down. By my invention, this constant distance may be properly maintained. Thus, the ratchet wheel 15 carries a screw-thread 17, by means of which one of the magnet cores $m$ may be advanced as the brake shoes wear down. The pawl 10 and its connections to the brake bars A and B are the same as have been already described.

The arrangement not only of the brake and of the releasing mechanism, but of the automatic adjusting means, may be varied without departing from the spirit of my invention, and I aim to cover in the appended claims all such modifications which come within the scope of the present invention.

What I claim as new and desire to secure by Letters Patent of the United States, is,

1. The combination with an electric motor, a controller for said motor and a brake, both constructed and arranged to coöperate to release the brake when the controller is moved from its off position, and to apply the brake when the controller is moved to its off position, and means constructed and arranged to be made operative by an increased, abnormal range of movement of the brake to and from its effective breaking position, due to wear, to maintain the effective operation of the brake substantially constant.

2. The combination, of an electric motor, a controller for the motor, a brake, means for normally applying the brake, means operated by the power application of the controller to release the brake, means for adjusting for the wear of the brake, and means controlled by an increased, abnormal range of movement of the brake to and from its effective braking position, due to wear, to operate said adjusting means.

3. The combination with a device to be braked, of a brake therefor, means for automatically applying the brake immediately upon the discontinuance of the application of power thereto, and means constructed and arranged to be made operative by an increased, abnormal range of movement of the brake to and from its effective braking position, due to wear, to maintain the effective operation of the brake.

4. The combination with a device to be braked, of a brake therefor, a spring arranged to normally apply the brake, and means constructed and arranged to be made operative by an increased, abnormal range of movement of the brake to and from its effective braking position, due to wear, to maintain the effective operation of the spring.

5. The combination with a device to be braked, of an adjustable, pivoted brake therefor, and means constructed and arranged to transmit an increased range of pivotal movement of the brake, to adjust the pivot of the brake.

6. The combination with a device to be braked, of a brake therefor, means for adjusting the brake, and means constructed and arranged to be operated by an abnormal range of movement of the brake, to operate said adjusting means.

7. The combination with an electric motor to be braked, of two adjustably pivoted arms having braking surfaces, a controller for the electric motor, the shaft of which controller extends between said arms and is constructed and arranged to force said arms apart when the controller is moved from its off position, and means constructed and arranged to be made operative by an increased, abnormal range of movement of the arms to and from the non-releasing position of the controller shaft, to adjust closer together the pivots of the arms.

8. The combination with a device to be braked, of two adjustably pivoted arms arranged to bear on opposite sides of said device to be braked, means for causing the operation of the device to be braked, a releasing device located between said arms and adapted to be made operative by said last-named means to force the arms from the device to be braked, and means constructed and arranged to be made operative by an increased, abnormal range of movement of the arms to and from the device to be braked, to adjust closer together the pivots of the arms.

9. The combination with a device to be braked, of two adjustably pivoted braking arms arranged to bear on opposite sides of said device to be braked, a releasing device located between said arms, means for forcing the arms against the device to be braked, and means constructed and arranged to be made operative by an increased, abnormal range of movement of the arms to and from the non-releasing position of said releasing device, to adjust closer together the pivots of the arms.

10. The combination with a device to be braked, of two adjustably pivoted braking arms arranged to bear against said device to be braked, means for adjusting the pivots of said arms, a link pivoted to one arm, a bellcrank lever pivoted to the other arm and to said link, and a connection from said lever, said connection being constructed and arranged to draw the pivots of the arms closer together, when the arms have an increased, abnormal range of pivotal movement, due to wear.

11. The combination with a device to be braked, of two braking arms arranged to bear against said device to be braked, a threaded rod on which the braking arms are pivotally mounted, a stationary nut engaged by said rod, a spring arranged to pivotally move the arms together, and means constructed and arranged to be made operative by an increased, abnormal range of movement of the arms, to operate the threaded rod to draw together the pivots of the arms.

12. The combination with a device to be braked, of two adjustably pivoted braking arms arranged to bear against said device to be braked, means for adjusting the pivots of the arms, means continuously exerting a force normally sufficient to force said arms toward each other on said pivots with an operative pressure against the device to be braked, and means constructed and arranged to be operated by an increased, abnormal range of movement of the arms, due to wear, to operate said adjusting means to hold the pivots closer together.

13. The combination with a member to be braked, of two braking members constructed and arranged to be movable toward each other against a device to be braked, means for operatively applying the braking members against the device to be braked, and means constructed and arranged to be made operative by an increased range of movement of the braking members, due to wear, to maintain the operative braking effect of said applying means.

14. In combination, an electric motor, a brake, means for releasing said brake when said motor is energized, and automatic means operative upon a relative displacement of the parts of said brake, due to wear, to restore said parts to their normal relative positions.

15. In combination with a device to be braked, of two pivoted breaking arms arranged to bear against said device to be braked, a link mechanism carried by said arms, and adjusting means arranged to be operated by said mechanism when said arms are relatively displaced due to wear.

16. In combination with a device to be braked, of two pivoted braking arms arranged to bear against said device to be braked, a link pivoted to one arm, a lever pivoted to the other arm and connected to said link, and adjusting means arranged to be operated by said lever when said arms are relatively displaced due to wear.

In witness whereof, I have hereunto set my hand this 10th day of May, 1904.

PHILIP J. DARLINGTON.

Witnesses:
BENJAMIN B. HULL,
HELEN ORFORD.